Oct. 22, 1929. A. C. DANKS Re. 17,464
WATER TUBE BOILER
Original Filed Jan. 17, 1927
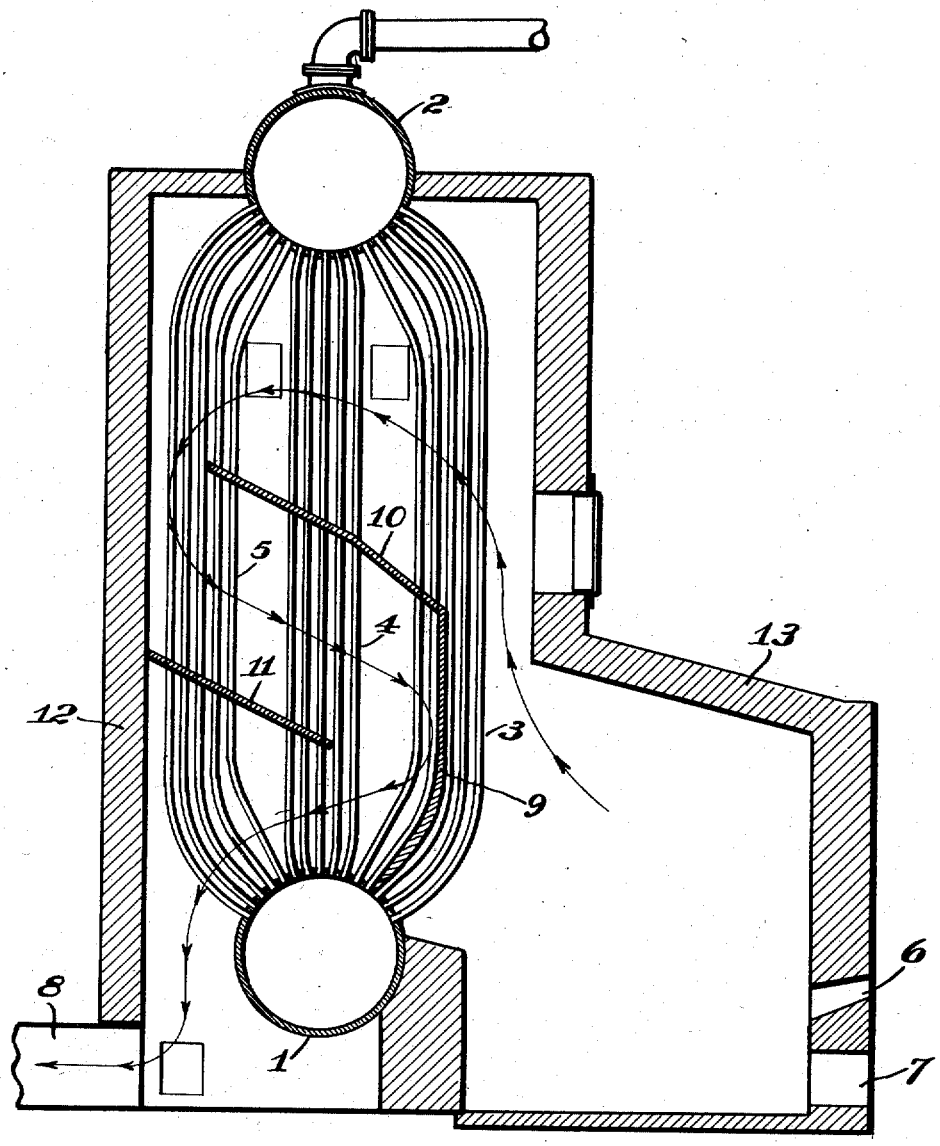
INVENTOR
Alfred C. Danks
by
James C. Bradley
Atty Reissued Oct. 22, 1929 Re. 17,464

UNITED STATES PATENT OFFICE

ALFRED C. DANKS, OF CLEVELAND, OHIO, ASSIGNOR OF ONE-HALF TO KINGSLEY L. MARTIN, OF MONTCLAIR, NEW JERSEY

WATER-TUBE BOILER

Original No. 1,707,627, dated April 2, 1929, Serial No. 161,532, filed January 17, 1927. Application for reissue filed August 3, 1929. Serial No. 383,295.

The invention relates to water tube boiler constructions, and particularly to the vertical type employing an upper drum and a bottom drum with a plurality of sets of tubes (preferably three) extending from the bottom drum to the upper drum. The invention has to do with the baffle arrangement, and involves a radical departure from the established practice in boilers of this type. Heretofore, it has been customary to arrange the baffles so that the gases of combustion, in and between the banks of tubes, travel longitudinally thereof, making relatively sharp bends adjacent the ends of the tube banks. In the present construction, the baffles are so arranged that the gases of combustion cross the various banks of tubes at substantially right angles thereto. The arrangement also results in an increase in the area of the available heating surface in the first and second passes, where the temperatures are higher, thus increasing the heat absorbing capacity of the apparatus, and reducing the stack temperatures. One embodiment of the invention is illustrated in the accompanying drawing, wherein:

The figure is a vertical section through a water tube boiler constructed in accordance with the invention.

Referring to the figure of the drawings, 1 is the lower drum, 2 is the upper drum, and 3, 4 and 5 are the front, middle and rear banks of water tubes respectively. In the particular construction shown, the boiler is fired by suitable gas burners, directed through the openings 6 and 7, but it will be understood that the boiler may be provided with the usual hand fired grates, or with an automatic stoker, or may be fired by any other approved method. Following the usual practice, the side of the construction on which the gases first pass the tubes, will be referred to as the front side, and the other side (left) on which the outlet flue 8 is located, will be referred to as the rear side, the banks or sets of tubes being correspondingly designated.

The flow of the gases of combustion across the banks of tubes 3, 4 and 5 is governed and directed by a pair of baffles, which constitute an important feature of the invention. The right hand baffle is made up of two sections, the lower section 9 extending longitudinally of the tubes 3, while the upper section 10 extends transversely of the tubes 3, 4 and 5, so that the gases of combustion sweep across the upper portions of all three banks of tubes before they flow downwardly and to the front.

The second baffle 11 extends inward from the rear wall 12 of the setting across the tubes 5 and 4, so that the gases of combustion are caused to sweep across the tubes 5 and 4 and into the tubes of the set 3, after which they pass forwardly and downwardly across the lower portions of the tubes 4 and 5 to the stack outlet 8. The baffles are preferably composed of suitable reinforced plastic material.

The baffles are preferably so arranged that the net cross sectional areas in the passes from the first to the last, decrease to correspond to the shrinkage of the gases in cooling, and the tubes in the middle bank 4 are divided by the two baffles into three sections increasing in length from the bottom section up. The net cross sectional areas of the passes, as compared with the damper area, is such that proper draft is insured.

The advantages incident to the baffle arrangement have been already set forth, heretofore, and include improved draft conditions and increased heat absorbing qualities, so that the arrangement materially increases the rating of boilers to which they are applied. The bends at the ends of the passes are also more gradual, and there are no contractions in cross sectional area in the various passes to a point below that of the damper or flue area, or any dead spaces in which gases are not in motion, so that the draft conditions are favorable. The available heating surface in the first and second passes, where the temperatures are highest is relatively large as compared with previous arrangements, which increases the heat absorbing capacity of the boiler and gives lower stack temperatures. The gradually decreased cross sectional area of the conduit or passageway for the gases of combustion also results in improved economy of operation for the reason heretofore pointed out. There are no spaces for the collection of soot, which are not readily accessible, and the baffle cost is far below that incident to baffles of the usual type as employed in boilers of the character specified. The location of the baffle section 9 in the bank of tubes 3 involves an advantage, as the portions of the tubes to the right of the section, are thus exposed to and receive the full benefit of the radiant or reflected heat from the opposite wall 13 of the combustion chamber, while the tubes to the left of this section 9 which are too far in to receive any substantial benefit from the reflected heat from the wall 13, are exposed to, and given the benefit of, the heated gases of combustion as they sweep along and across the tubes in making the turn.

What I claim is:

1. In combination in a boiler of the vertical type, having a lower drum and an upper drum arranged in substantially vertical alinement one above the other and three sets or banks of water tubes extending upward from the lower drum to the upper drum, a fire box, an outlet flue at the rear of the boiler at the lower portion thereof, a baffle extending from the lower drum longitudinally of the tubes of the front bank for a portion of their length and then transversely of such tubes and across the middle bank of tubes and across the space between the middle and rear banks of tubes and terminating short of the rear side of the rear banks of tubes, and a second baffle extending inward from the vertical rear wall of the boiler setting across the rear bank of tubes and into the middle bank of tubes and spaced below the transverse portion of the first baffle.

2. In combination in a boiler of the vertical type, having a lower drum and an upper drum arranged in substantially vertical alinement one above the other, and three sets or banks of water tubes extending upward from the lower drum to the upper drum, a fire box, an outlet flue at the rear of the boiler at the lower portion thereof, a baffle extending from the lower drum longitudinally of the tubes of the front bank for a portion of their length and then transversely of such tubes and across the middle bank of tubes and across the space between the middle and rear banks of tubes and terminating short of the rear side of the rear banks of tubes, and a second baffle extending inward from the vertical rear wall of the boiler setting across the rear bank and into the middle bank of tubes and spaced below the transverse portion of the first baffle, the portion of the first baffle which extends longitudinally of the front bank of tubes being located between the rear tube of such bank and the front tube thereof.

3. In combination in a boiler of the vertical type having a lower drum and an upper drum arranged in substantially vertical alinement one above the other and a plurality of sets or banks of water tubes extending upward from the lower drum to the upper drum and including a front bank and a rear bank, a fire box, an outlet flue at the rear of the boiler at the lower portion thereof, a baffle extending longitudinally of the tubes of the front bank for a portion of their length and then transversely of such tubes and into the rear bank, but terminating short of the rear side of such rear bank, and a second baffle extending inward from the vertical rear wall of the boiler setting across the rear bank of tubes and spaced below the transverse portion of the first baffle and terminating short of the front bank of tubes.

In testimony whereof, I have hereunto subscribed my name this 23rd day of July, 1929.

ALFRED C. DANKS.